(12) United States Patent
Todd

(10) Patent No.: US 8,150,812 B2
(45) Date of Patent: Apr. 3, 2012

(54) METHODS, APPARATUS AND COMPUTER PROGRAMS FOR DATA REPLICATION

(75) Inventor: Stephen J Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 11/945,616

(22) Filed: Nov. 27, 2007

(65) Prior Publication Data
US 2008/0098044 A1   Apr. 24, 2008

Related U.S. Application Data

(62) Division of application No. 11/153,281, filed on Jun. 15, 2005, now Pat. No. 7,716,181.

(51) Int. Cl.
*G06F 7/00* (2006.01)
*G06F 17/00* (2006.01)
(52) U.S. Cl. ......... 707/662; 707/661; 707/644; 707/646
(58) Field of Classification Search .................. 707/662, 707/661, 644, 646
See application file for complete search history.

(56) References Cited

U.S. PATENT DOCUMENTS

| 5,781,912 | A | 7/1998 | Demers et al. ............... 707/202 |
| 5,870,761 | A | 2/1999 | Demers et al. ............... 707/202 |
| 7,089,383 | B2 * | 8/2006 | Ji et al. ........................ 711/162 |
| 2004/0199812 | A1 * | 10/2004 | Earl et al. ...................... 714/13 |

* cited by examiner

*Primary Examiner* — Tony Mahmoudi
*Assistant Examiner* — Paul Kim
(74) *Attorney, Agent, or Firm* — Steven E. Bach

(57) ABSTRACT

Methods, apparatus and computer programs are provided for data replication, such as for replicating a database or updating a cache. Source database change transactions are captured and batched together for efficient data transfer. On receipt at a target replica system, the batch of transactions within a message is separated and separate apply transactions corresponding to the source transactions are performed in parallel. A 'transaction processed' table is updated to reflect apply processing for each apply transaction. This table provides a confirmation of the status of each transaction that can be used during recovery processing to prevent re-apply of an apply transaction. The table can also be used to determine when it is safe to delete an incoming message from persistent storage on the target system, and to facilitate one-phase commit processing.

9 Claims, 5 Drawing Sheets

FIG. 5

MESSAGE STATUS:

| TIME T0 | m5 | m4 | m3 | m2 | m1 |
|---|---|---|---|---|---|
| TIME T1 | m5 | m4 | m3 | m2 | X |
| TIME T2 | m5 | m4 | X | m2 | X |
| TIME T3 | m5 | m4 | X | m2 | -- |
| TIME T4 | m5 | m4 | X | X | -- |
| TIME T5 | m5 | X | X | X | -- |
| TIME T6 | m5 | -- | -- | -- | -- |

KEY      m1....m5 = MESSAGE NUMBER
              X = PROCESSED MESSAGE
              -- = DELETED MESSAGE

METHODS, APPARATUS AND COMPUTER PROGRAMS FOR DATA REPLICATION

CROSS-REFERENCE TO RELATED APPLICATIONS

This application is a divisional application of application Ser. No. 11/153,281 filed on Jun. 15, 2005, now U.S. Pat. No. 7,716,181.

FIELD OF INVENTION

The present invention relates to methods, apparatus and computer programs for data replication, such as for maintaining a database replica or data cache.

BACKGROUND

Many businesses and their customers demand high availability of data in databases—including fast, reliable data access and the ability to access up-to-date data from any point in a distributed network. A single, centralized database may be relatively easy to maintain but may have unacceptable access delays resulting from communication bottlenecks, processor and disk access speed limitations and a lack of fail-over recovery capability. Also, a centralized database may not provide the ability to initiate updates with low latency from multiple points in the network.

Therefore, databases are commonly replicated to multiple data processing systems within the network. Each replica provides low latency access to local database users and/or fail-over recovery capability in case of failures. Database replication also enables users of portable data processing devices to work with an updated copy of a database (or part of a database) that is stored on the portable device, instead of having to maintain a constant wireless connection to a centralized database. Database replication may be periodic—according to a defined schedule—or may be continuous based on database changes or by user requests.

A database replication method typically involves capturing database changes at one of the systems storing a database replica, sending the changes to a second system, and applying the changes to a database replica stored on the second system. It is known in the art for the capture process to read changes from log records maintained by a database manager on the first system. Thus, an application program responds to user inputs to request updates to the database replica on the first system, and the local database manager applies the updates to its local replica and updates its recovery log. A capture process running on the first system reads the recovery log and forwards recent log records to the second system. The original database update and writing of log records at the first system, and the apply process running on the second system, are typically implemented under transactional control. Thus, data integrity can be maintained despite process and hardware failures, even in a distributed environment in which multiple changes may be initiated concurrently from different points in the network. A single database change transaction may involve several individual changes that must all be completed successfully, or all backed out, to maintain data integrity. Mechanisms other than log scraping may be used to capture the change transactions.

The database changes may be communicated between database replica systems via messaging, such as implemented by the RepliData™ database replication product from IBM Corporation. Each message typically contains a full record of the changes of an originating database change transaction (unless the data size is too large for a single message). A suitable messaging system is the WebSphere™ MQ message queuing software from IBM Corporation. A database change transaction performed at the transaction-originating system, and transactions performed at a sender system of a replication transmission, are referred to below as 'source transactions' or 'captured transactions'.

One known approach to database replication uses intermediate staging tables that contain a description of the changes made to a first database replica, the information in the staging tables then being applied to other replicas. Although such staging tables can be useful to asynchronously manage updates to database replicas, the staging tables may act as a bottleneck that limits the throughput of database changes. There are ever-increasing business demands for high throughput—some applications (such as in the banking sector) requiring several million database changes to be managed every day. Therefore, communication bottlenecks that limit database replication throughput will not be acceptable in future.

There is a need in the art for improved low-latency data replication in a distributed data processing environment. Improved low-latency replication is required for cache management as well as for database replication. There is also a need in the art for efficient methods for ensuring once-only application of data updates to a cache or database replica, with recovery processing to maintain data integrity when failure occur.

SUMMARY

A first embodiment of the invention provides a method of data replication. Data changes performed as source transactions at a first data processing system are captured, and the captured changes (or descriptions of the changes) for a plurality of source transactions are combined to form a batch of source transactions. The batch of source transactions is then transmitted to a second data processing system. On receipt of the batch at the second data processing system, the descriptions of data changes are separated from the batch into sets of changes corresponding to their respective source transactions. For each separate source transaction, the corresponding set of changes is applied to a data replica at the second data processing system as a respective separate apply transaction.

In one embodiment, each separate apply transaction includes the step of writing a 'transaction processed' record to indicate completion of the respective apply transaction. The method of data replication includes checking said 'transaction processed' records to determine whether apply transactions have been completed for all of the plurality of source transactions. There may be a single table containing 'transaction processed' records for all changes applied to a data replica. The table may include a transaction ID and a sequence ID for each source transaction applied to the replica.

The batch of source transactions may be transmitted within a single message that is received and held in persistent storage (for example in a persistent message queue or database) at the second data processing system. The message is only deleted from persistent storage on the second data processing system in response to determining that apply transactions have been completed for all of the plurality of source transactions.

Batched transfer of a plurality of source transactions enables improved data transfer efficiency. Controlled deletion of the message only after completion of apply processing for all of the batched source transactions ensures that recovery is possible in the event of a failure during the apply processing.

The step of writing records indicating completion of apply transactions facilitates efficient one-phase commit of the apply operations.

The unbatching of source transactions before applying the data changes to a replica retains the potential for parallel apply processing for each source transaction. There may be several apply threads running concurrently at a database replica system.

The first data instance may be a primary copy of a database, to which application programs write changes (add/delete/ modify). The data replica may be a complete or partial database replica.

In one method according to the invention, a message is not deleted from the second data processing system until a check is performed that all of the batched plurality of source transactions have been successfully applied. This control of retention and deletion of the message ensures that recovery is possible in the event of a failure while applying the source transactions. For example, if a message m1 includes transactions t1, t2, . . . t5, the transactions may be unbatched and applied independently and in parallel. If a failure occurs after t1, t2 and t5 have been applied and committed, but while t3 and t4 are incomplete, it will be necessary to recover the uncommitted change transactions from the stored copy of the message. A table may be maintained at the target system to keep track of apply processing of individual source transactions. The table is updated when an apply transaction corresponding to an individual source transaction is performed on the local data replica on the target system. The table provides status information for determining which transactions have been successfully applied. This table is referred to herein as the 'transaction processed' table. A message cleaner process checks this table before deleting any messages.

In addition to using the 'transaction processed' table to determine when messages can be deleted safely, the table may also be used to facilitate efficient one-phase commit processing of apply transactions for improved apply processing. The steps of applying database changes and updating the 'transaction processed' table are performed together—within a single apply transaction that is committed when the table record has been successfully written. Thus, in one embodiment of the invention, the apply process uses the table of processed source transactions and the above-described method of managing deletion of messages to ensure database integrity in the event of a failure during the apply processing. The 'transaction processed' table is updated to record that a transaction has been applied at the same time as the database changes are applied, but physical deletion of the message that contained the transaction may occur later as an asynchronous clean-up operation. This contrasts with approaches in which deletion of a message is a step of a two-phase or multi-phase commit process rather than a subsequent clean-up operation.

One-phase commit processing, using the information in the 'transaction processed' table, can provide efficiency improvements over conventional two-phase commit processing. The table of processed source transactions together with the controlled retention and deletion of messages can be used to ensure that no source transactions are lost and none are applied more than once.

If a failure occurs during the apply processing, a recovery process according to one embodiment of the invention uses the 'transaction processed' table for recovery processing. The failure may be a failure of the apply process itself, failure of a messaging system, or failure of the database or operating system or hardware of the network node at which the apply processing is being performed. In one embodiment, two levels of recovery processing are implemented. The first recovery process is performed by the database, and the second recovery process is performed by the restarting apply process. The database recognizes that any transactions started but not committed by the previous apply process will never complete and so backs them out. This is known in the art as 'presumed abort' processing. The second recovery process is implemented within the program code controlling the apply process' restart sequence. The 'transaction processed' table is read into memory. The apply process then starts reading messages from its input message queue, using the information in the 'transaction processed' table to prevent re-application of any apply transactions that were already performed by the apply process before the failure.

Thus, the 'transaction processed' table may be used both to control deletion of messages and during recovery processing to ensure once-only application of source transactions to a data replica.

In another embodiment of the invention, the above-described 'transaction processed' table may also be used for message order verification. To avoid a message order verification process identifying errors in response to valid out-of-order processing of messages, messages are not deleted from the apply program's input queue if the deletion would leave gaps between the sequence numbers of the messages remaining on the queue. Instead, messages are only deleted from the queue when their deletion will not result in sequence number 'holes', but a record of apply processing of each transaction within each message is written to the table of processed source transactions. The records in the table of processed source transactions can be used to prevent a transaction being applied twice.

In one embodiment, changes to the first data instance are captured by reading recovery log records written by a first database manager at the first data processing system. The capture process may include filtering database changes to select database changes (for example specific database tables or rows) for which at least one subscriber has registered an interest. Alternatively, database triggers, change exits or other mechanisms may be used to capture changes corresponding to source transactions.

A further embodiment provides a method of managing apply processing for data replication, to replicate changes made to a first data instance held at a source data processing system. The method includes receiving a data transmission at a current data processing system. The data transmission comprises a batch of descriptions of data changes made to the first data instance as a plurality of source transactions at the source data processing system, and the method includes separating the descriptions of data changes from the batch into sets of changes corresponding to their respective source transactions. For each separate source transaction, the corresponding set of changes are applied to a data replica at the current data processing system as a respective separate apply transaction. In one embodiment, each separate apply transaction includes the step of writing a 'transaction processed' record to indicate completion of the respective apply transaction, and the method includes checking the 'transaction processed' records to determine whether apply transactions have been completed for all of the plurality of source transactions.

Further embodiments of the invention provide data processing apparatus supporting replication between data replicas within a network. A source data processing apparatus includes a data processing unit; a data storage unit for storing a first data instance (for example, data within tables of an originating database and a database manager program); a database change capture program; and a messaging subsystem for transmitting captured database changes to a replication target data processing apparatus. The capture program may control batching of a plurality of individual source data change transactions within each message, for efficient message transfer to the target system.

A target data processing apparatus includes a data processing unit; a data storage unit; a messaging system for receiving messages from a source data processing apparatus; a target database replica; and an apply program for applying database changes to the target database replica. The apply program may implement the above-described unbatching of individual transactions within a message, and control separate apply processing for the separate transactions. The apply program may include an apply broker for each incoming message queue, for resolving potential conflicts between dependent transactions and allocating individual transactions to a plurality of apply agents running in parallel.

The apply program may be configured to implement the above described method steps of applying the plurality of database change transactions to a second database replica and writing a record for each captured database change transaction applied to the second database replica. The apply program may also perform the record check, prior to deleting the message from the second data processing system, to determine whether all of the plurality of database change transactions have been applied. Having confirmed that all of the plurality of database change transactions have been applied, the apply program deletes the message from the second data processing system.

The methods described above, including the described steps of the capture and apply programs, may be implemented as computer program products that comprise computer program code recorded on a recording medium. The program code controls operations of a data processing apparatus on which the program code executes.

BRIEF DESCRIPTION OF DRAWINGS

Embodiments of the invention are described below in detail, by way of example, with reference to the accompanying drawings in which:

FIG. 5 shows an example of state changes of a set of messages on a queue, according to an embodiment of the invention.

DETAILED DESCRIPTION OF EMBODIMENTS

Figure 1:
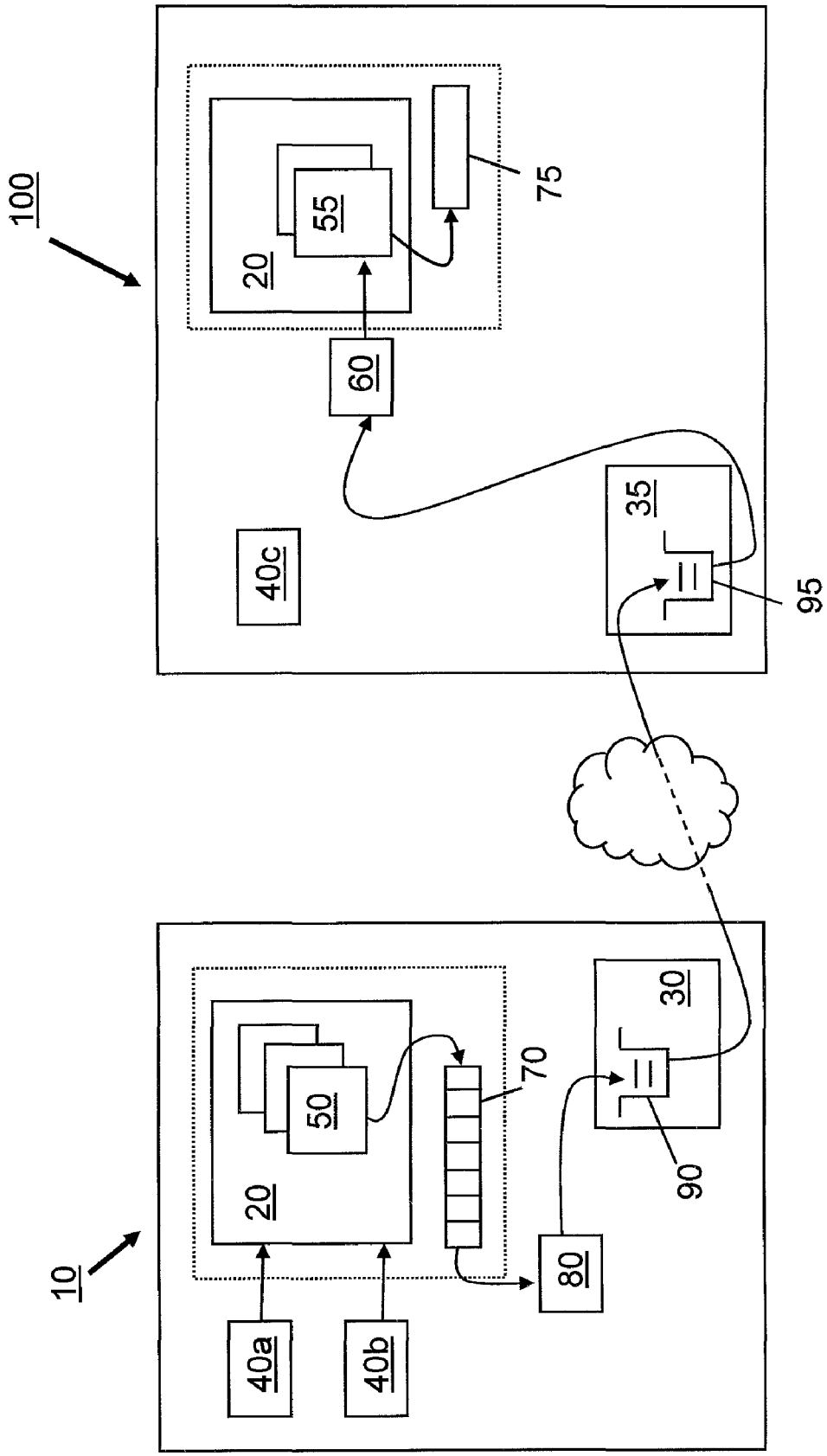
FIG. 1 is a schematic representation of components of a distributed data processing network, including replicated database instances.

It will be apparent to a person skilled in the art that individual steps of the methods described below can be performed under the control of computer program code and that a variety of programming languages and coding implementations may be used to implement the methods and components described herein. Such computer programs are not intended to be limited to the specific example control flows described below, and steps represented as if performed sequentially may be performed in parallel. One or more of the operations described in the context of a computer-program-controlled implementation could alternatively be performed by a hardware electronics component.

Some portions of the following description refer to 'algorithms' for performing operations on data within a computer memory. An algorithm is a self-consistent sequence of steps leading to a desired result. The steps are those requiring physical manipulations of physical quantities. Usually, these quantities take the form of electrical or magnetic signals capable of being stored, transferred, combined, compared, and otherwise manipulated. It is frequently convenient to refer to these signals as bits, values, elements, characters, numbers, or the like. It should be borne in mind, however, that the above and similar terms are to be associated with the appropriate physical quantities and are merely convenient labels applied to these quantities. Unless specifically stated otherwise, discussions within the present specification utilising terms such as "computing", "calculating", "determining", "comparing", "generating", "selecting", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers, or other such information storage, transmission or display devices.

The present specification also discloses apparatus for performing the operations of the methods, including components of a messaging-based data replication solution within a distributed data processing network. Apparatus for implementing the invention may be specially constructed for the required purposes, or may comprise one or more general-purpose computers or other devices selectively activated or reconfigured by computer programs stored in the computers or devices. The algorithms and methods described below are not inherently related to any particular computer hardware or other hardware apparatus. Various general-purpose machines may be used with programs in accordance with the teachings herein. Alternatively, a method according to the invention may be implemented within more specialised apparatus.

In addition, the present specification discloses a recording medium for storing a computer program for performing the operations of the methods. The recording medium is taken herein to include any computer readable medium and any transmission medium for communicating the computer program between a source and a destination. The recording or transmission medium may include storage devices such as magnetic or optical disks, memory chips, or other storage devices suitable for interfacing with a general-purpose computer. The transmission medium may also include a hardwired medium such as exemplified by typical Internet-connected server computers, or a wireless medium such as exemplified in the GSM mobile telephone system.

Where steps or features in any of the accompanying drawings are referenced by the same reference numerals, those steps and/or features have the same or similar functions or operations in the context of the present description.

System Architecture

A distributed database replication system is shown in FIG. 1. The source data processing apparatus 10 is running a database manager program 20 and messaging software 30 for communicating with programs running on another data processing apparatus 100 within the network. A suitable database manager program is the DB2™ database management software and a suitable messaging program is the WebSphere™ MQ messaging software, both from International Business Machines Corporation. One or more applications 40a, 40b may be running on the source data processing apparatus, updating the local database replica 50 via the database manager 20. When the database manager 20 updates the local database replica 50, the database manager program also writes database change transactions to a recovery log 70. The database recovery log 70 contains database changes resulting from the operations of all applications 40*a*, 40*b* connected to the database manager 20. Also running on the local data processing apparatus is a capture program 80 that is used when replicating local database changes to other database replicas. The capture program 80 reads database change transactions from the recovery log and passes the captured information to an input queue of a messaging system 30 for delivery to other systems in the network. In a two-way or 'update anywhere' replication solution, the local data processing apparatus is also running an apply program 60 (not shown) that is used for applying database changes initiated elsewhere in the network.

Figure 2:
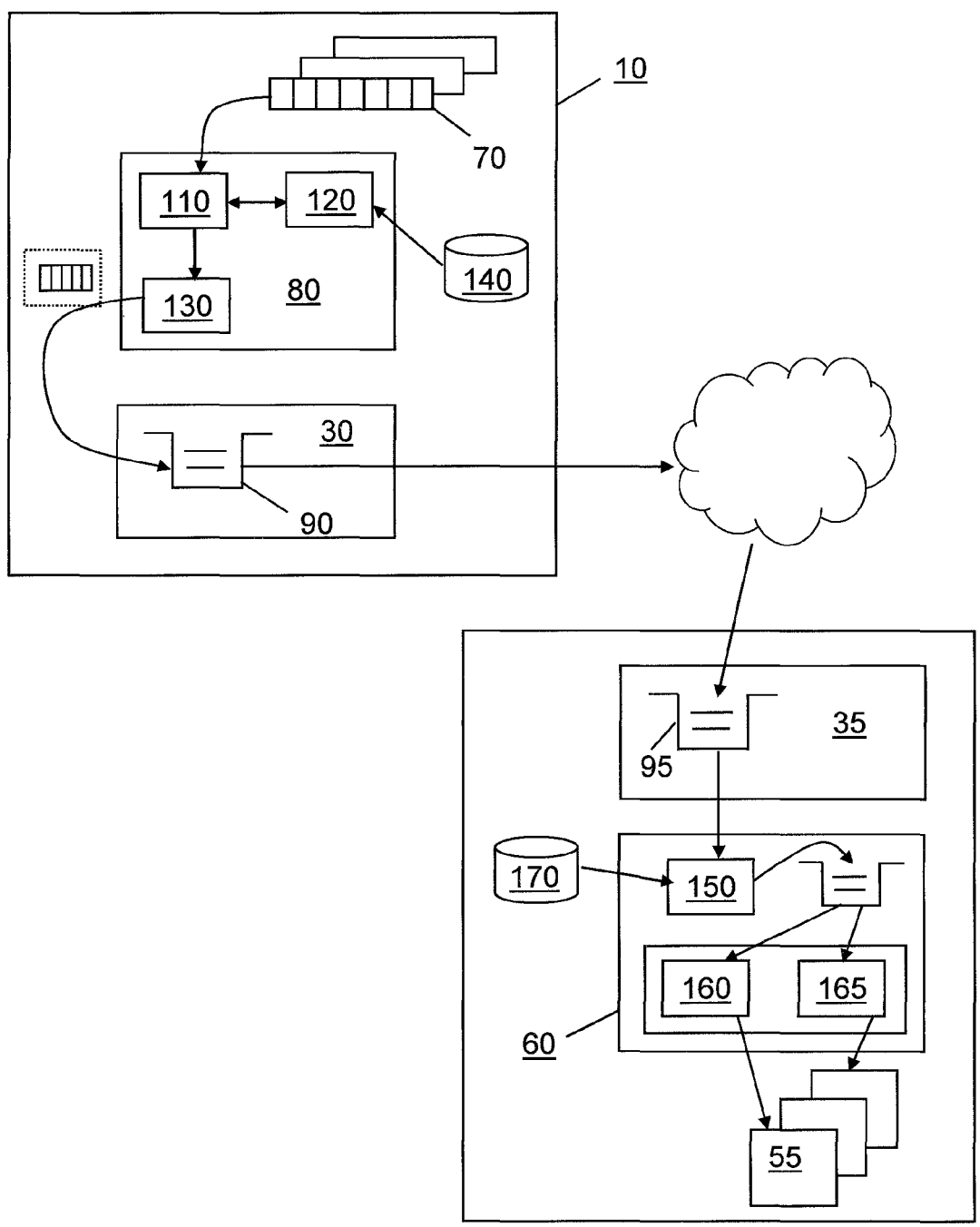
FIG. 2 shows components of the capture process of FIG. 1.
Figure 3:
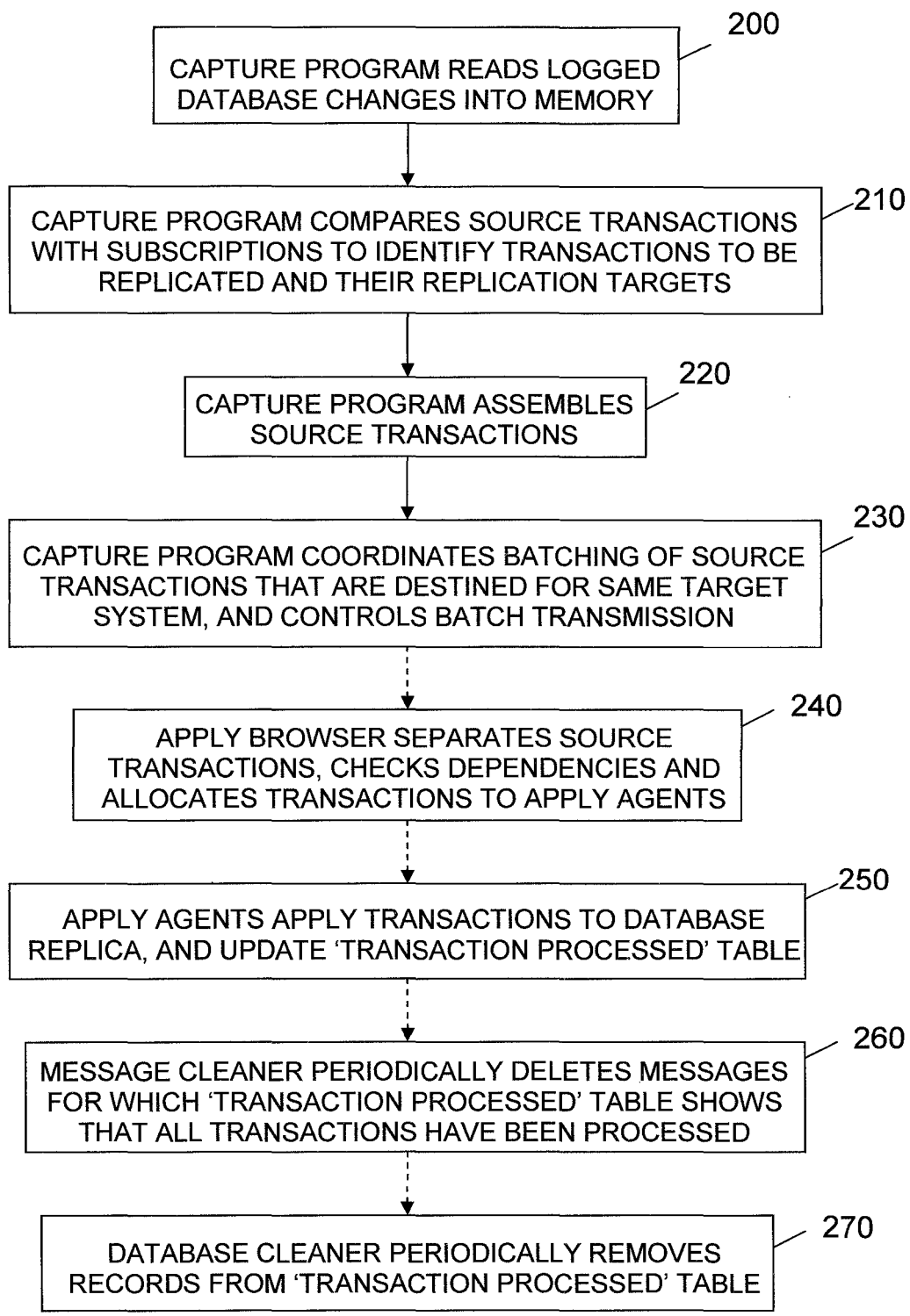
FIG. 3 shows steps of a method of database replication, according to a first embodiment of the invention.

As shown in FIGS. 2 and 3, the capture process 80 includes a log reader 110 and a batching component 130 for controlling batching of multiple source database change transactions for transmission to target database replica systems. The log reader 110 reads the database recovery log 70 and extracts 200 change information for the subset of database tables for which a replication subscription exists. The log reader collates the change data for each source data change transaction. Once the log reader identifies a commit log record for a source transaction, the changes are read by a subscription matching component 120. The subscription matching component 120 filters the identified database changes, by looking for matches within a repository 140 of subscriptions to determine 210 which changes are of interest to a subscribing target database replica. A subscription held in the repository 140 specifies the queue to which database table changes should be written, together with a set of send options, the set of table columns that the target is interested in and a predicate for filtering out rows.

The capture program 80 reconstructs 220 database change transactions in the local system's memory, which in many cases involves combining a plurality of individual database changes that form part of a single source change transaction. This reconstruction is controlled by the logic of the source transaction. The first role of the capture program 80 is to extract all data relating to the source transactions of interest to subscribers and to faithfully reconstruct the transactions.

The capture program 80 then coordinates batching 230 of source transactions together, for inclusion within a single message. This batching of a plurality of source transactions takes account of which transactions are to be sent to which target systems and which outgoing transmission queues at the sender system are to be used for messages to be sent to subscribing database replicas. The batching also takes account of characteristics of the messaging system to be used for transmission to replica systems, including consideration of:
1. The maximum message size of the messaging system (which may be, for example, 30 kbytes or 60 kbytes);
1. Decisions made by the batcher 130 to force a messaging transaction (then all partially assembled messages are forced even if below optimum size);

A second level of batching may be performed—batching a plurality of messages within a single unit of work in the messaging system. Messages which are to be sent via the same messaging node (the target or an intermediate node between the source and the target) may be batched together—and the messages may be intended for one or more target queues and one or more subscribers. Batching of messages is known in the art, but known messaging systems do not also provide batching and unbatching of source data change transactions.

This 'second-level' batching of messages takes account of:
the maximum message batch size (both in terms of the total message size and a maximum number of messages);
a batch time—forcing a batch out after a predefined time (for example, 0.5 seconds) even if below optimum size; and
whether there is any more data to be batched (a batch may be forced if there is no new data available for a given time, such as 0.1 seconds).

It is clear from the above description that decisions made by the batcher regarding when to force a batch of messages may also influence the batching of transactions within a message. Nevertheless, for simplicity, the following description will refer to a solution in which source change transactions are batched within a message without specifying whether a plurality of messages are themselves batched together.

The capture program 80 passes the batch of source change transactions to the local messaging program 30. In response to the capture program, the messaging program 30 generates messages that can each include the plurality of transactions corresponding to a batch, and places each message in an outgoing message queue 90 ready for transfer across the network to a replica database system 100.

The transfer of messages between data processing systems is handled asynchronously by the messaging programs 30, 35—moving each message from an outgoing queue 90 on the first system 10 across the network to an incoming queue 95 on the target system 100.

A target database replica 55 running on the target system 100 is updated 250 by the apply program 60 that is local to the target database replica. The apply program comprises an apply browser 150 that reads incoming messages into memory (except for excessively large messages that may be executed directly from the queue by the browser—improving efficiency for that message but at the expense of some loss of concurrency). There is one apply browser 150 per incoming queue. The apply browser 150 separates 240 the transactions within a batch, resolves dependencies between transactions and queues each transaction for an apply agent 160,165 to execute.

The apply agents directly update 250 the target tables of the target database replica 55. A repository 170 contains the source-to-target column mapping and various housekeeping information, for use by the apply process.

Multiple instances of the capture and apply processes may be running independently and simultaneously at each database server 10, 100. Each instance of capture 80 has its own repository 140 of subscriptions, and each instance of apply 60 has its own repository 170 containing mappings. In a one-way replication implementation, no replication capture program 80 is required at the target system 100 and no replication apply program 60 is required at the source system 10. However, in a two-way or 'any-to-any' replication solution, each apparatus may include capture and apply programs.

Replication Processing

FIG. 3 shows the steps of a replication method according to an embodiment of the invention. (The dashed arrows in FIG. 3 and FIG. 4 indicate that, in the embodiments shown, the steps performed before and after the dashed arrows are performed asynchronously). As described above, a log reader 110 of the capture process reads 200 database change information from the recovery log into memory. Each log record typically includes:
An identification of the database tables changed by each database change transaction;
An identification of one or more columns of each changed database table;

A description of the data inserted, deleted or modified by each change transaction;

An identification of the source transaction that made the change to the first database replica; and A timestamp.

The log reader uses the identification of a respective source transaction to assemble 220 relevant change records to reconstruct a source transaction. When the log reader identifies a commit log record for a data change transaction, the changes are read by a subscription matching component 120. The information regarding which database tables and columns each change relates to is compared 210 with a repository 140 of subscriptions. The subscriptions specify which database tables and columns should be replicated to which database replicas (i.e. which information within the logged set of changes is of interest to particular users or organizations). The subscriptions may specify filter predicates for selecting a subset of changes of particular interest and disregarding (filtering out) other changes. The subscriptions specify a memory address and queue name identifying a queue managed by the local messaging subsystem 30.

Database change transactions that match one or more of the subscriptions within the repository 140 are batched 230 together (as described below) and copied to a respective identified outgoing message queue 90 of the local messaging subsystem 30. Each outgoing message queue of the messaging subsystem 30 is associated with one or more target messaging subsystems 35 on other data processing systems of the network (or an intermediate messaging subsystem on route to the target). In particular, database change transactions that are destined for the same target messaging system may be batched together within a single message (or a set of messages).

Handling Batched Source Transactions

The messages are transmitted 230 between systems via a network of communicating messaging subsystems 30,35, and each message is received and placed into a respective input queue 95 at the target system 100. For each hop between adjacent message managers, the messages are only deleted from the sending system 10 when confirmed as successfully received at a receiver system (which is the target system 100 or an intermediate receiver system running a messaging manager on route to the target system).

In an alternative embodiment, only a single message queue manager and message queue is involved in the message transfer. This modification of the message transfer does not necessitate changes to the capture and apply processing described herein.

Each input queue 95 on the target system is served by a respective apply broker 150 of the apply program 60, as described above. The apply broker retrieves a message from its input queue and separates out 240 the individual database change transactions within the retrieved message (unbatches the batch). The apply broker 150 passes each transaction to a set of apply agents 160, 165 for parallel execution—resolving 240 any conflicts between transactions (see below) when assigning transactions to the individual apply agents. A receiving apply agent applies 250 the changes within each received transaction to the relevant table of the database replica, as described above.

The apply broker ensures that parallel processing of source database change transactions is handled without compromising database integrity. The apply broker checks 240 for dependencies between the transactions it is about to assign to the apply agents. This involves checking whether two or more transactions within a set of transactions to be assigned to the apply agents will change the same database table fields, or whether they related by other dependencies in the database. Where the same fields are to be updated by more than one transaction, the transactions are assigned 240 to the same apply agent in their original sequence, or an alternative mechanism may be used to enforce serialism of the application of these transactions. The apply agent then handles any potentially-conflicting source transactions serially and in their original sequence.

With an update-anywhere, multi-way replication, the analysis of allowable parallelism is more complex than in one-way replication. However, the conflict resolution is nevertheless implementable using known techniques and so is not described in more detail in this document.

Transaction Processed Table

As messages are processed from the queue and updates are applied 250 to the database replica, a record is made 250 in a 'transaction processed' table to indicate which transactions and which messages have been successfully processed. When a message is retrieved from the queue and the batch is separated out 240 into individual transactions, an entry may be created in the 'transaction processed' table for each transaction. If entries are created at retrieval time, the initial status of each transaction as shown in the table is 'in doubt'. A retrieved message may also be marked as 'in doubt' on the queue, but in the present embodiment this marking is not required since the 'transaction processed' table may be relied on to provide the message status information.

There is a single 'transaction processed' table for all database changes to be applied by a particular apply broker. The table has control information such as transaction ID and/or sequence ID. The 'transaction processed' records indicate whether an apply transaction has been successfully performed, and may contain further explicit status information. The use of the 'transaction processed' table described above is differentiated from a solution that performs replication using a different intermediate database change table for each source database table being monitored. In a solution using multiple intermediate change tables, the reconstruction of a source transaction could involve extraction of data from potentially many change tables.

The relevant entries in the 'transaction processed' table are updated 250 (or the record is created if not created previously) when the transactions are applied to the database replica to confirm the new status of 'transaction applied'. Thus, the 'transaction processed' table provides a confirmation of the status of each database change transaction within each message.

Periodically, a message cleaner program reads 260 the 'transaction processed' table, or an in-memory cached copy of the table, to identify messages for which all transactions have been successfully applied, and then deletes 260 the associated messages. Thus, a message that is retrieved from the apply browser's input queue is not physically deleted from persistent storage on the second data processing system, until a check is performed to verify that all of the plurality of source database change transactions within the message have been successfully applied to the database replica. This ensures that recovery is possible in the event of a failure while applying the database transactions, without requiring complex two-phase commit processing.

For example, if a message m1 includes transactions t1, t2, . . . t5, the transactions are unbatched and applied independently and in parallel. If a failure occurs after t1, t2 and t5 have been applied, but while t3 and t4 are incomplete, it will be necessary to recover the uncommitted change transactions from the stored copy of the message. The 'transaction processed' table maintained at the target system keeps track of individual transactions, and the message cleaner thread checks this table before deleting any messages. In this way, the identification of processed source transactions in the 'transaction processed' table is used to ensure that no message is deleted until the message is no longer required for recovery processing.

If a failure does occur, the apply program's recovery processing checks the 'transaction processed' table to confirm which transactions have been successfully processed and should not be reapplied, and to confirm which transactions have not yet been applied.

In order to perform this processing, the apply program keeps a record of the mapping from source transactions into messages for all outstanding (uncommitted) messages. This information is implicit in the messages and can be reconstructed on restart (after a controlled shutdown or failure) and so there is no need to maintain this mapping in a persistent form other than by storing the incoming message persistently.

As the cleaner is periodic, a message may be retained in the apply program's incoming message queue for a period after apply transactions have been performed for all source change transactions. The message must not be deleted until all of the source transactions within the message have been applied to the data replica, but there is no requirement to delete the message immediately after the set of transactions is applied.

A separate periodic database cleaner program deletes 270 records from the 'transaction processed' table after the corresponding messages have been deleted from the apply broker's incoming message queue, as described in more detail below.

Single-Phase Commit

The replication apply algorithm can be optimized using a single phase commit process, using the 'transaction processed' table described above. Messages may be read from the apply broker's input queue as a non-transactional read operation, and each operation of applying a change to a database replica and each update to the 'transaction processed' table can be performed transactionally with a single phase commit. Single phase commit is less costly in terms of processing time and concurrency, and hence throughput, than known two phase commit processing. Satisfactory recovery capability is provided by the combination of a single phase commit and the 'transaction processed' table, which can be relied on to show when a message can be safely deleted.

The periodic execution of the above-described message cleaner reads 260 the 'transaction processed' records in the table. The message cleaner deletes 260, from the incoming message queue, any messages for which the 'transaction processed' table shows that all database change transactions have been successfully applied. A non-transactional read operation is used to read records from the 'transaction processed' table, and the deletion of messages is performed under transactional control (i.e. required messages are not deleted and no message is only partially deleted, even if failures occur).

Each database replica system running an apply program may retain a cached copy of the 'transaction processed' table in main system memory, to that the table does not have to be repeatedly accessed from disk storage during normal run-time processing. The table is then only read into main memory from disk storage during system restart. The table is updated and persisted transactionally to ensure correct restart processing.

The apply program also employs a periodic execution of a database cleaner, which deletes 270 records from the 'transaction processed' table. This database cleaner execution involves a non-transactional read of the message queue to verify that the queue does not contain a message corresponding to records of the 'transaction processed' table before those records are deleted. The records in the 'transaction processed' table are deleted under transactional control. This avoids deleting records that may be required.

The method described above can provide significant efficiency improvements. For example, to process N database change transactions using a standard two-phase commit process requires N database and message transaction executions. If each transaction requires 3 log forces (if either the database manager or messaging manager is used as commit coordinator), or 5 log forces (if an external coordinator is used), a minimum of 3N log forces is required. In contrast, a single phase commit apply process requires 1 log force for each of N source transactions, N/k message transactions for message clean-up (if each message includes a batch of k transactions), followed by N/kj database transactions for the record clean-up step (if kj represents the transaction batch size for the periodic 'message completion' records clean-up). 3N can be expected to be much greater than N+N/k+N/kj, especially if k is large (many database change transactions in a single message). In some cases, known two phase commit processes are significantly more expensive than single phase commits.

Recovery Processing

As noted above, a failure may be a failure of the apply process itself, a failure of a messaging system, or failure of the database or operating system or hardware of the network node at which the apply processing is being performed. At system restart following a failure, two levels of recovery processing are performed. The first recovery process is performed by the database, and the second recovery process is performed by the restarting apply process.

The database recognizes that any transactions started but not committed by the previous apply process will not complete and so backs them out. This is known in the art as 'presumed abort' processing. Any transaction that was partially processed in an earlier apply process execution, but was not committed, will be backed out by the database. Any written but uncommitted 'transaction processed' record will also be backed out.

The second recovery process is implemented within the program code controlling the apply process' restart sequence. The 'transaction processed' table is read into memory. The apply process then starts reading messages from the head of its input message queue (reading all messages that are persistent and so survived the failure). However, before messages are processed following the restart, the apply process checks the 'transaction processed' table to identify any messages for which all database change transactions have already been successfully applied. Any apply transactions shown by the 'transaction processed' table to have been fully processed before the failure are not repeated. The restarting apply process does not need to differentiate between transactions that were previously unprocessed and transactions that were partially processed (for example, partially applied, or fully applied but not committed).

Additional details of a specific example of recovery processing are described in more detail below in the section entitled 'Confirming Message Sequence'.

It can be seen that the above-described batching of multiple source transactions within a message and the associated use of the 'transaction processed' table to keep track of individual database change transactions is complementary to the single-phase commit optimization of the apply algorithm. If single phase commit is to be implemented as described above, the additional apply processing associated with unbatching and separate application of unbatched database change transactions can be achieved with a relatively small additional overhead.

Confirming Message Sequence

The above-described 'transaction processed' table may also be used for message order verification. The replication capture and apply programs provide an example of a distributed application that comprises both a work item producer and a work item consumer. A queue of work items flows from producer to consumer, and the work items may be represented as messages in a queue. There may be a single work item in each message or multiple work items may be batched by the producer into a single message and consumed by the consumer processes as a single work item. As described above, a batch of work items may also be 'unbatched' and processed separately by the consuming apply program.

For many applications, there is a requirement for the consumer to process work items in precisely the order the producer produces them. Message queuing systems can generally assure that no messages will be lost or delivered out of order. However, there are exceptional cases where ordering may be interrupted or messages misrouted. Examples include messages sent to a dead letter queue and where alternate channel routing is invoked.

For this reason, it is sometimes desirable for the producing application to allocate each produced message with a sequence number and for the consuming application to verify that the messages arrive in order and with no gaps in the sequence number. Even in the case of batching, the single (large) work message can typically be identified by a sequence number. Where both producer and consumer are single threaded this is relatively straightforward, with some care being needed to make sure that sequence number for the last emitted/consumed message is transactionally hardened to a log (for use in the event of restart). This hardening may, for example, be achieved from the application by writing the sequence information to a persistent message in a 'side' queue. In some implementations, sequence number information may be added to other information that needs to be hardened (for example, this will happen if a side queue message is written in the same transaction that reads the main queue). This limits the performance impact.

In other cases, such as the example replication solution described above, the consumer is not single-threaded. Instead, the replication apply program (consumer) consists of a single-threaded, non-transactional 'master' browser that examines incoming messages and dispatches them to transactional 'slave' worker threads for processing. The browser performs analysis of the incoming messages to determine (application dependent) possible valid parallelisations. Thus, some application dependent out-of-order processing may be acceptable and a single browser thread may drive multiple concurrent worker threads without breaking the ordering requirements. The worker threads may consume messages in an order that is adequate for the application but does not exactly match the original sequence. This results in gaps between the sequence numbers of the remaining unprocessed work items on the queue—referred to hereafter as 'holes' in the sequence. Such holes are not errors—they are temporary and indicate valid out-of-order processing. However, other gaps in the sequence may indicate an error.

When verifying correct sequencing of the messages, there is a need to ensure that order verification is not misled by the holes left by valid parallel execution. There is a requirement for efficient order verification and controlled parallel execution that works robustly over restarts—whether after a controlled shutdown or after a system failure.

When the system is functioning normally, the browser thread is able to keep track of the work items it has browsed and can detect any missing work items (for example, via non-sequential sequence numbers). However, a problem occurs when the browser thread has to commence browsing from the queue again following a restart. A restart may follow an orderly shutdown, or a system failure may lead to a recovery process having to recover the queue to the state that it was in prior to the failure.

If the browser were to start order verification of work items from the very beginning of the queue, the browser thread is likely to identify any holes corresponding to processed work items (items processed and deleted from the queue) as evidence of an error. However, in many applications some out-of-order processing is acceptable, and so the holes may be a result of valid parallel execution. Additionally, if the browser thread starts order verification of the queue too far ahead of the point reached before the failure or shutdown, the browser thread may fail to detect real errors.

Figure 4:
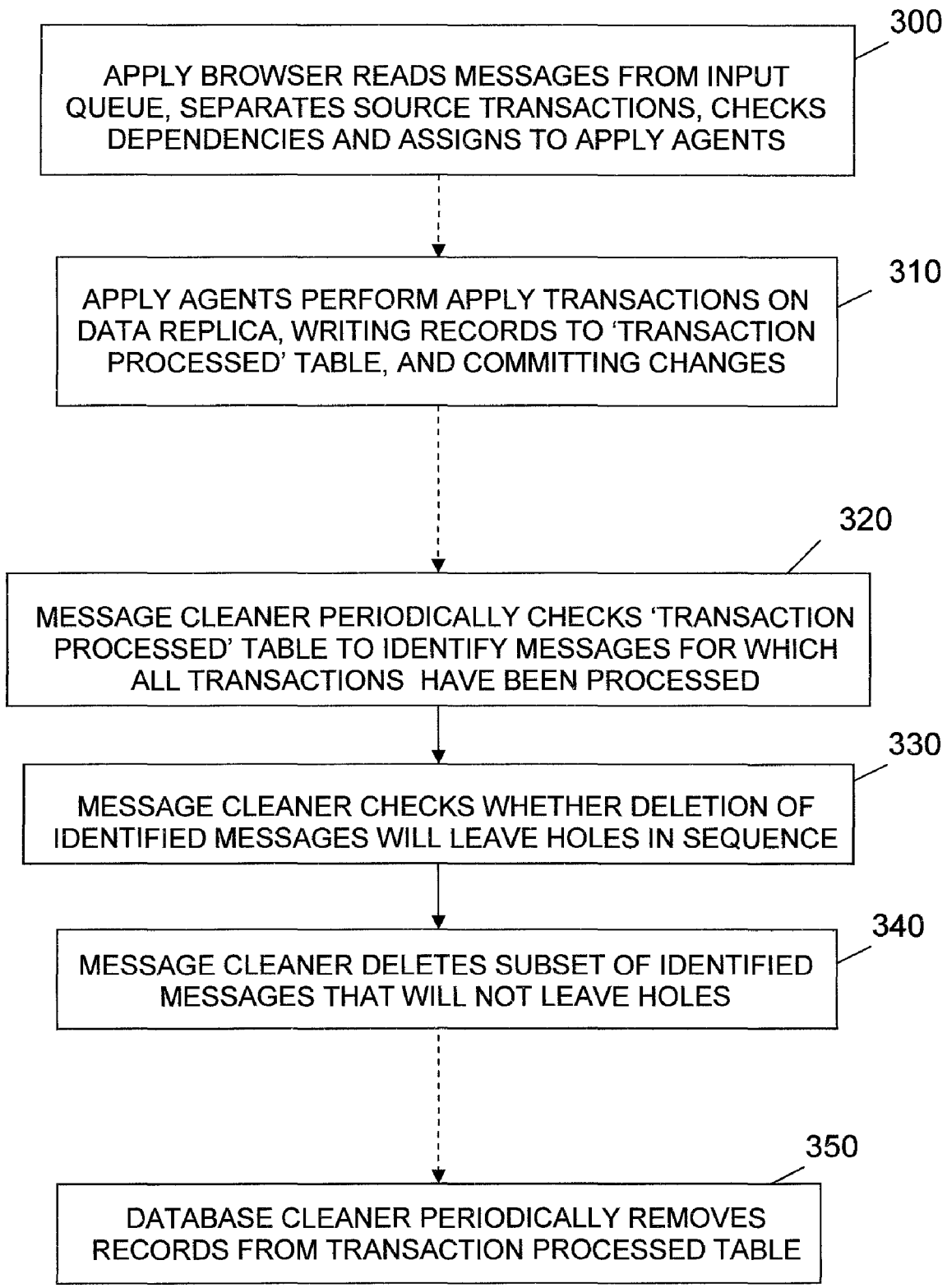
FIG. 4 shows steps of an alternative method of database replication, according to a second embodiment of the invention.

A solution to this problem is to perform order verification with reference to the browser's input queue, but to prevent the message cleaner thread from deleting any messages from the queue that would create holes. Such a solution is shown in FIG. 4. The apply browser 150 reads messages from its input queue and separates 300 each message into a set of separate constituent transactions. The apply browser then checks for dependencies between transactions and assigns transactions to apply agents 160,165 (avoiding conflicts as described above). When the retrieved messages are processed 310 out-of-order (but in a valid sequence, as determined by the browser's dependency checks), the relevant records within the 'transaction processed' table are updated 310 to indicate each transaction processed. The set of updates corresponding to an apply transaction are committed after writing the 'transaction processed' record.

On each periodic execution of the message cleaner process, only a subset of messages are deleted from the input queue. The message cleaner checks 320 the transaction processed table to determine which messages have had all their source transactions applied to the data replica. Before deleting any messages, the message cleaner checks 330 whether deletion of fully processed messages would result in holes in the sequence of queued messages. Any messages that were validly processed but would leave holes in the message sequence are not deleted from the queue at this time. Subject to this avoidance of holes, the message cleaner process of the apply program deletes the messages for which the 'transaction processed' table confirms that all transactions have been successfully processed by the apply program.

On restart of the system, the apply browser processes messages from the input queue other than those messages for which the 'transaction processed' table shows that processing was completed. If the 'transaction processed' table indicates that some transactions within a message have been applied, those completed transactions are not reapplied but any remaining transactions within the message are applied. Thus, message deletion can be performed as a background task separate from the apply transactions—since the 'transaction processed' table can be relied on to show which messages and which specific transactions have been successfully applied.

Database integrity is thus maintained by applying each database update transaction and writing corresponding records within the 'transaction processed' table under transactional scope. That is, both the database update transaction and the records in the 'transaction processed' table must be completed successfully, or both must be backed out.

On the next periodic execution of the message cleaner process, any holes that existed at the time of the previous execution are likely to have been removed by processing of other messages in the sequence.

FIG. 5 shows a simple example of the changes of state of a set of messages on a queue. Initially, at time T0, there are a set of five unprocessed messages m1, m2, m3, m4 and m5 on a replication apply browser's input queue. Let us assume that, by time T1, the first message m1 is processed. Let us assume that the third message, m3, is processed next by one of the apply agents, at time T2. The message cleaner program executes at time T3, by which time m1 and m3 have been processed. The message cleaner deletes m1 from the queue, since the transaction processed table confirms that the transactions within the message have been successfully applied. The transactions within m3 have also been successfully applied, but to delete m3 would result in a hole in the remaining message sequence number of messages on the queue. Therefore m3 is not deleted during this execution of the message cleaner program. Let us assume that messages 2 and 4 are processed next, at times T4 and T5 respectively. At time T6, the message cleaner process executes again. Since all of messages m1, m2 and m3 have now been processed, all of these messages can be deleted from the queue without leaving any holes, so the deletion is performed leaving only message m5 remaining on the queue.

It will be clear to persons skilled in the art that a number of alternatives to the implementations described in detail above are within the scope of the present invention.

For example, the above description of an example implementation describes a replication capture program performing batching. In an alternative embodiment, the batching of transactions within a message (and batching of messages) may be performed by the sender messaging system, after a capture program implements extraction from the log records and the reconstruction of transactions in memory. Performance of batching by the messaging system will, however, entail additional processing costs to handle interactions between the capture program and the messaging system, and between the messaging system and the apply program. If the messaging system implements the batching of transactions, the messaging system will provide information to the apply program to enable separation of the batched transactions ('unbatching' before apply).

In some database applications, there will be occasional source transactions for which the database changes are too large to efficiently write into a single message. Such messages may be spread over several associated messages. The invention can be implemented to cater for such large source transactions, while batching smaller transactions as described above.

The above described embodiment includes a description of log scraping as the capture mechanism. Alternative capture mechanisms, such as database triggers and change exits, are also within the scope of the present invention.

In the embodiment described above, any changes within incomplete (uncommitted) transactions are backed out by the database, and then the 'transaction processed' table is used to determine which transactions must be applied. In another embodiment, all of the changes relating to messages that were not fully processed are backed out (i.e. not only the incomplete transactions). 'Fully processed', in this context, means that the replication apply process has completed applying all source transactions from the message to the relevant data replica and has written corresponding records in the 'transaction processed' table. In such an embodiment, the 'transaction processed' table may include a data field for a record that indicates whether apply transactions have been completed for all source transactions within an incoming message.

In the above description of specific embodiments, a messaging system has been described for transmission of change information and intermediate storing of persistent messages. The transmission of data change information may be handled by a message queue manager (such as may be referred to in the art as a message-oriented middleware product), but this is not essential. Alternative transmission and intermediate storage solutions are within the scope of the invention, including transfer via a database or file store.

For example, where a database is used to hold the transmitted change information, a 'transaction processed' table may hold a transaction ID and/or sequence ID, whereas a blob of data within a database may contain encoded change information for a batch of captured source transactions. Thus, the database blob is equivalent to the message contents within the implementation described above. In the present embodiment, the 'transaction processed' table is held at the target replica database to enable one-phase commit. However, in various embodiments, a database table comprising the blob field may be held in the source database, the target replica database, or another convenient database.

The specific implementation of the message transfer does not dictate the implementation of the batching of source transactions, unbatching at the apply side for separate application of apply transactions corresponding to the source transactions, or controlled retention and deletion of data to achieve assured once-only apply processing.

What is claimed is:

1. A computer implemented method of data replication, comprising the steps of:
capturing a description of changes to a first data instance, which changes are performed as source transactions at a first data processing system;
combining the captured descriptions of change for a plurality of source transactions, to form a batch of source transactions;
transmitting the batch of source transactions to a second data processing system, wherein the batch is transmitted to the second data processing system within a message;
receiving the transmitted batch at the second data processing system and separating the descriptions of changes from the batch into sets of changes corresponding to their respective source transactions, wherein the message is held in persistent storage at the second data processing system until a check of transaction processed records determines that apply transactions have been completed for all of the plurality of source transactions; and
for each separate source transaction, applying the corresponding set of changes to a data replica at the second data processing system as a respective separate apply transaction transforming a memory at the second data processing system to match a memory state of the first data processing system and writing a transaction processed record to indicate completion of the respective apply transaction;
a message cleaner process periodically checking the transaction processed records to identify messages for which apply transactions have been completed for all of the respective plurality of source transactions;
the message cleaner process checking whether deletion of any of the said identified messages would result in holes in the sequence of messages held in persistent storage; and the message cleaner process then deleting only a subset of said identified messages so as to avoid holes in said sequence of messages.

2. The method of claim 1, wherein said separate apply transactions are performed in parallel.

3. The method of claim 1, further comprising the recovery steps of:
   in response to a failure while applying the changes to the data replica, reading the message form said persistent storage at the second data processing system and checking the 'transaction processed' records to determine which source transaction within a message have been applied to the data replica as a completed apply transaction and so should not be reapplied; and
   applying changes to the data replica for which the 'transaction processed' records do not show completion of an apply transaction.

4. The method of claim 1, wherein each separate apply transaction, including the writing of a transaction processed record to indicate completion of the respective apply transaction, is committed using a one-phase commit process.

5. The method of claim 1, wherein the step of capturing a description of changes comprising reading log records for changes made to a first data instance.

6. The method of claim 1, wherein the step of capturing a description of changes comprising comparing changes made to a first data instance with subscriptions indicating which types of data changes are to be replicated.

7. An apparatus for data replication, comprising:
   two or more data processing systems, each having a processing unit, a storage unit with data stored therein and a message transmission unit; at least one of said data processing systems having a capture program for capturing transaction data changes and batching transaction change descriptions; and at least one of said data processing systems having a plurality of change agents for applying data change descriptions to data in the storage unit and an apply browser for reading data change descriptions, resolving conflicts and assigning data change descriptions to the apply agents; whereby the apparatus:
   capturing a description of changes to a first data instance, which changes are performed as source transactions at a first data processing system;
   combining the captured descriptions of change for a plurality of source transactions, to form a batch of source transactions;
   transmitting the batch of source transactions to a second data processing system wherein the batch is transmitted to the second data processing system within a message;
   receiving the transmitted batch at the second data processing system and separating the descriptions of changes from the batch into sets of changes corresponding to their respective source transactions, wherein the message is held in persistent storage at the second data processing system until a check of transaction processed records determines that apply transactions have been completed for all of the plurality of source transactions; and
   for each separate source transaction, applying the corresponding set of changes to a data replica at the second data processing system as a respective separate apply transaction and writing a transaction processed record to indicate completion of the respective apply transaction;
   and further comprising:
   a message cleaner periodically checking the transaction processed records to identify messages for which apply transactions have been completed for all of the respective plurality of source transactions;
   the message cleaner checking whether deletion of any of the said identified messages would result in holes in the sequence of messages held in persistent storage; and
   the message cleaner then deleting only a subset of said identified messages so as to avoid holes in said sequence of messages.

8. The apparatus of claim 7, further comprising in the at least one data processing systems having a plurality of change agents for applying data change descriptions to data in the storage unit and an apply browser for reading data change descriptions, resolving conflicts and assigning data change descriptions to the apply agents:
   a transaction processed table indicating when each transaction apply is completed.

9. A computer program product comprising program code recorded on a non-transitory, computer-readable recording medium for controlling applying data changes to a data replica, comprising:
   program code for capturing a description of changes to a first data instance, which changes are performed as source transactions at a first data processing system;
   program code for combining the captured descriptions of change for a plurality of source transactions, to form a batch of source transactions;
   program code for transmitting the batch of source transactions to a second data processing system, wherein the batch is transmitted to the second data processing system within a message;
   program code for receiving the transmitted batch at the second data processing system and separating the descriptions of changes from the batch into sets of changes corresponding to their respective source transactions, wherein the message is held in persistent storage at the second data processing system until a check of transaction processed records determines that apply transactions have been completed for all of the plurality of source transactions; and
   program code for, for each separate source transaction, applying the corresponding set of changes to a data replica at the second data processing system as a respective separate apply transaction and writing a transaction processed record to indicate completion of the respective apply transaction;
   program code for periodically checking the transaction processed records to identify messages for which apply transactions have been completed for all of the respective plurality of source transactions;
   program code for checking whether deletion of any of the said identified messages would result in holes in the sequence of messages held in persistent storage; and
   program code for deleting only a subset of said identified messages so as to avoid holes in said sequence of messages.

* * * * *